Patented July 9, 1940

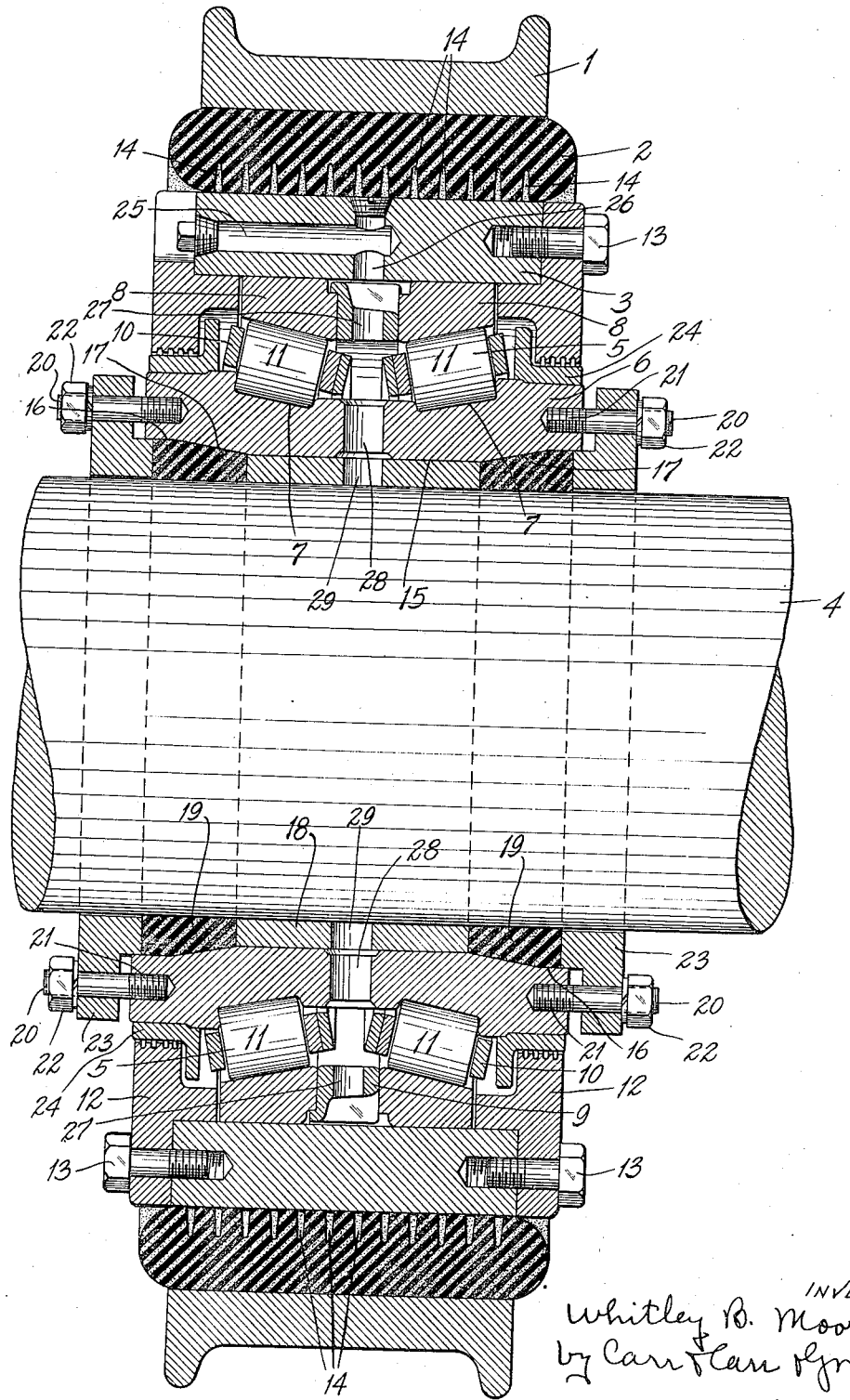

2,207,352

UNITED STATES PATENT OFFICE 2,207,352

SHAFT BEARING MOUNTING

Whitley B. Moore, Canton, Ohio, assignor to The Timken Roller Bearing Company, Canton, Ohio, a corporation of Ohio Application March 4, 1938, Serial No. 193,874

3 Claims. (Cl. 308—35)

My invention relates to bearings for shafting, and has for its principal object a roller bearing mounting for shafting which includes an emergency plain bearing and which is resiliently mounted. Other objects and advantages will appear hereinafter.

The invention consists principally in mounting the inner bearing member of a roller bearing for shafting on a plain bearing or bushing and providing means which normally holds said inner bearing member and bushing stationary, but which permits rotation thereof under certain conditions, such as failure of the roller bearing. The invention further consists in the shaft bearing mounting and in the parts and combinations and arrangements of parts hereinafter described and claimed.

The accompanying drawing is a longitudinal sectional view of a shaft bearing construction embodying my invention.

The drawing illustrates a shaft bearing mounting including a pedestal or supporting frame 1, an annular ring 2 of resilient material therein, a bearing housing 3 supported in said resilient ring, a shaft 4 extending through the housing and a roller bearing 5 interposed between said shaft and housing, the roller bearing illustrated being of the type shown in Vanderbeek Patent No. 1,884,925. Said bearing includes a double cone 6 or inner bearing member, having conical raceways 7 tapering towards each other, and separate cups 8 or outer bearing members mounted in the housing, a spacer 9 for maintaining said cups in position and cages 10 for the two series of tapered rollers 11 interposed between the cups 8 and the raceway portions 7 of the cones 6. The ends of said housing 3 are closed by suitable annular plates 12 that are held by means of cap screws 13. The resilient supporting ring 2 is preferably provided with annular slots 14 around its inner periphery.

The bore of the cone or inner bearing member has a central cylindrical portion 15, counterbored cylindrical end portions 16 and tapering portions 17 extending from the counterbored end portions 16 to the central portion 15. Mounted tight in the central cylindrical portion 15 of the cone bore is a sleeve 18 of bronze or other bearing metal and the shaft 4 extends through said sleeve, having a running fit therein. Mounted in the cone bore are rings 19 of compressible material, as rubber, of a sectional shape to fit the space between the shaft 4 and the tapering portions 17 of the bore and the counterbored end portions 16 of the bore. Secured to the ends of the bearing cone 6, as by studs 20 having one end 21 threaded into the bearing cone and having nuts 22 mounted on the other end, are gland members 23 for said packing rings 19. By tightening these glands 23, the rubber rings 19 may be compressed so as to have tight engagement with the cone 6 and with the shaft 4, thereby normally causing the cone to rotate with the shaft, but permitting rotation of the shaft within the cone if needed, as by failure or locking of the roller bearing.

Mounted on the ends of the cone 6 are flinger rings 24 of angular section that cooperate with the closure plates 12 to prevent the escape of lubricant, said rings being preferably of bronze or other bearing material that will have a minimum of frictional resistance with the closure plates in the event of roller bearing failure.

The housing 3 may be provided with a longitudinal passageway 25 for lubricant opening into a transverse passageway 26 that communicates with the space between cups 8. The spacer 9 has radial lubricant passageways 27, the bearing cone 6 has radial lubricant passageways 28 and the bushing has radial lubricant passageways 29.

The above described construction provides a roller bearing mounting for line shafting and other shafts, with the important safeguard of a plain bearing which is permitted to function in the event of locking or failure of the roller bearing. These advantages are obtained with a simple and inexpensive construction, which normally operates as a very successful roller bearing. Obviously, different types of roller bearing may be used from that disclosed and other changes may be made without departing from the invention, so that I do not wish to be limited to the precise construction shown.

What I claim is:

1. A shaft bearing mounting comprising a shaft, a cylindrical bushing of bearing metal thereon, a double inner bearing cone whose bore has a central cylindrical portion in which said bushing is mounted, tapered bearing rollers on the raceways of said cone, an outer bearing cup for each series of rollers, means spacing said cups apart, a housing in which said bearing cups are mounted, compressible packing rings of elastic material in the ends of said cone and glands secured to said cone for compressing said packing rings.

2. A shaft bearing mounting comprising a shaft, a cylindrical bushing thereon, a double inner bearing cone whose bore has a central cylindrical portion in which said bushing is mounted, tapered bearing rollers on the raceways of said cone, an outer bearing cup for each series of rollers, means spacing said cups apart, a housing in which said bearing cups are mounted, said cone having counterbores in its end and tapering bore portions between said counterbores and said central cylindrical bore, compressible packing rings of elastic material in the ends of said cone and glands secured to said cone for compressing said packing rings.

3. A shaft bearing mounting comprising a shaft, a cylindrical bushing thereon, a double inner bearing cone whose bore has a central cylindrical portion in which said bushing is mounted, said bushing having a running fit on said shaft and a tight fit in said cone, tapered bearing rollers on the raceways of said cone, an outer bearing cup for each series of rollers, means spacing said cups apart, a housing in which said bearing cups are mounted, said cone having counterbores in its end and tapering bore portions between said counterbores and said central cylindrical bore, compressible packing rings of elastic material in the ends of said cone and glands secured to said cone for compressing said packing rings.

WHITLEY B. MOORE.